United States Patent
Meiri et al.

(10) Patent No.: US 10,565,058 B1
(45) Date of Patent: Feb. 18, 2020

(54) ADAPTIVE HASH-BASED DATA REPLICATION IN A STORAGE SYSTEM

(71) Applicant: EMC Corporation, Hopkinton, MA (US)

(72) Inventors: David Meiri, Cambridge, MA (US); Xiangping Chen, Sherborn, MA (US); William Stronge, Westford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 995 days.

(21) Appl. No.: 15/085,188

(22) Filed: Mar. 30, 2016

(51) Int. Cl.
*G06F 16/27* (2019.01)
*G06F 3/06* (2006.01)
*G06F 11/14* (2006.01)
*G06F 16/901* (2019.01)

(52) U.S. Cl.
CPC .......... *G06F 11/1448* (2013.01); *G06F 16/27* (2019.01); *G06F 16/9014* (2019.01); *G06F 3/0631* (2013.01)

(58) Field of Classification Search
CPC ................. G06F 16/27–278; G06F 3/06–0698
See application file for complete search history.

(56) References Cited

U.S. PATENT DOCUMENTS

| | | | |
|---|---|---|---|
| 4,164,763 A | 8/1979 | Briccetti et al. | |
| 4,608,839 A | 9/1986 | Tibbals, Jr. | |
| 4,821,178 A | 4/1989 | Levin et al. | |
| 5,276,898 A | 1/1994 | Kiel et al. | |
| 5,319,645 A | 6/1994 | Bassi et al. | |
| 5,537,534 A | 7/1996 | Voigt et al. | |
| 5,539,907 A | 7/1996 | Srivastava et al. | |
| 5,627,995 A | 5/1997 | Miller et al. | |
| 5,710,724 A | 1/1998 | Burrows | |
| 5,732,273 A | 3/1998 | Srivastava et al. | |
| 5,860,137 A | 1/1999 | Raz et al. | |

(Continued)

FOREIGN PATENT DOCUMENTS

| | | |
|---|---|---|
| EP | 1804157 | 7/2007 |
| WO | WO 2010/019596 | 2/2010 |

(Continued)

OTHER PUBLICATIONS

RCE and Response to Final Office Action dated Jun. 13, 2018 for U.S. Appl. No. 15/076,946, filed Aug. 30, 2018; 17 Pages.

(Continued)

*Primary Examiner* — Robert W Beausoliel, Jr.
*Assistant Examiner* — Nirav K Khakhar
(74) *Attorney, Agent, or Firm* — Daly, Crowley, Mofford & Durkee, LLP

(57) ABSTRACT

Described embodiments provide systems and methods for performing hash-based data replication in a storage system. The hash-based data replication replicates selected data from a source device to a target device of the storage system. One or more operating conditions of the storage system are determined. Based upon the determined operating conditions, one or more configuration settings of data replication operations are set. The data replication operation is initiated for the selected data, and sends, based upon the one or more configuration settings, at least one of (i) a hash value associated with the selected data to the one or more target devices, and (ii) the selected data to the one or more target devices.

20 Claims, 8 Drawing Sheets

(56) References Cited

U.S. PATENT DOCUMENTS

| | | |
|---|---|---|
| 5,896,538 A | 4/1999 | Blandy et al. |
| 5,903,730 A | 5/1999 | Asai et al. |
| 5,940,618 A | 8/1999 | Blandy et al. |
| 5,940,841 A | 8/1999 | Schmuck et al. |
| 5,987,250 A | 11/1999 | Subrahmanyam |
| 5,999,842 A | 12/1999 | Harrison et al. |
| 6,226,787 B1 | 5/2001 | Serra et al. |
| 6,327,699 B1 | 12/2001 | Larus et al. |
| 6,353,805 B1 | 3/2002 | Zahir et al. |
| 6,470,478 B1 | 10/2002 | Bargh et al. |
| 6,496,908 B1 | 12/2002 | Kamvysselis et al. |
| 6,519,766 B1 | 2/2003 | Barritz et al. |
| 6,553,464 B1 | 4/2003 | Kamvysselis et al. |
| 6,640,280 B1 | 10/2003 | Kamvysselis et al. |
| 6,643,654 B1 | 11/2003 | Patel et al. |
| 6,654,948 B1 | 11/2003 | Konuru et al. |
| 6,658,471 B1 | 12/2003 | Berry et al. |
| 6,658,654 B1 | 12/2003 | Berry et al. |
| 6,862,632 B1 | 3/2005 | Halstead et al. |
| 6,870,929 B1 | 3/2005 | Greene |
| 6,883,018 B1 | 4/2005 | Meiri et al. |
| 6,886,164 B2 | 4/2005 | Meiri |
| 6,898,685 B2 | 5/2005 | Meiri et al. |
| 6,910,075 B2 | 6/2005 | Marshak et al. |
| 6,938,122 B2 | 8/2005 | Meiri et al. |
| 6,944,726 B2 | 9/2005 | Yoder et al. |
| 6,968,369 B2 | 11/2005 | Veprinsky et al. |
| 6,976,139 B2 | 12/2005 | Halstead et al. |
| 7,000,086 B2 | 2/2006 | Meiri et al. |
| 7,024,525 B2 | 4/2006 | Yoder et al. |
| 7,032,228 B1 | 4/2006 | McGillis et al. |
| 7,051,176 B2 | 5/2006 | Meiri et al. |
| 7,054,883 B2 | 5/2006 | Meiri et al. |
| 7,099,797 B1 | 8/2006 | Richard |
| 7,113,945 B1 | 9/2006 | Moreshet et al. |
| 7,114,033 B2 | 9/2006 | Longinov et al. |
| 7,143,410 B1 | 11/2006 | Coffman et al. |
| 7,174,423 B2 | 2/2007 | Meiri et al. |
| 7,197,616 B2 | 3/2007 | Meiri et al. |
| 7,228,456 B2 | 6/2007 | Lecrone et al. |
| 7,240,116 B2 | 7/2007 | Marshak et al. |
| 7,251,663 B1 | 7/2007 | Smith |
| 7,292,969 B1 | 11/2007 | Aharoni et al. |
| 7,315,795 B2 | 1/2008 | Homma |
| 7,376,651 B2 | 5/2008 | Moreshet et al. |
| 7,380,082 B2 | 5/2008 | Meiri et al. |
| 7,383,385 B2 | 6/2008 | Meiri et al. |
| 7,383,408 B2 | 6/2008 | Meiri et al. |
| 7,386,668 B2 | 6/2008 | Longinov et al. |
| 7,389,497 B1 | 6/2008 | Edmark et al. |
| 7,392,360 B1 | 6/2008 | Aharoni et al. |
| 7,409,470 B2 | 8/2008 | Halstead et al. |
| 7,421,681 B2 | 9/2008 | DeWitt, Jr. et al. |
| 7,430,589 B2 | 9/2008 | Veprinsky et al. |
| 7,475,124 B2 | 1/2009 | Jiang et al. |
| 7,552,125 B1 | 6/2009 | Evans |
| 7,574,587 B2 | 8/2009 | DeWitt, Jr. et al. |
| 7,577,957 B1 | 8/2009 | Kamvysselis et al. |
| 7,613,890 B1 | 11/2009 | Meiri |
| 7,617,372 B1 | 11/2009 | Bjornsson et al. |
| 7,672,005 B1 | 3/2010 | Hobbs et al. |
| 7,702,871 B1 | 4/2010 | Arnon et al. |
| 7,714,747 B2 | 5/2010 | Fallon |
| 7,814,218 B1 | 10/2010 | Knee et al. |
| 7,827,136 B1 | 11/2010 | Wang et al. |
| 7,870,195 B1 | 1/2011 | Meiri |
| 7,908,436 B1 | 3/2011 | Srinivasan et al. |
| 8,046,545 B2 | 10/2011 | Meiri et al. |
| 8,078,813 B2 | 12/2011 | LeCrone et al. |
| 8,200,923 B1 | 6/2012 | Healey et al. |
| 8,327,103 B1 | 12/2012 | Can et al. |
| 8,332,687 B1 | 12/2012 | Natanzon et al. |
| 8,335,771 B1 | 12/2012 | Natanzon et al. |
| 8,335,899 B1 | 12/2012 | Meiri et al. |
| 8,380,928 B1 | 2/2013 | Chen et al. |
| 8,429,346 B1 | 4/2013 | Chen et al. |
| 8,468,180 B1 | 6/2013 | Meiri et al. |
| 8,478,951 B1 | 7/2013 | Healey et al. |
| 8,504,517 B2 * | 8/2013 | Agrawal ............... G06F 16/273 |
| | | 707/610 |
| 8,515,911 B1 | 8/2013 | Zhou et al. |
| 8,539,148 B1 | 9/2013 | Chen et al. |
| 8,566,483 B1 | 10/2013 | Chen et al. |
| 8,578,204 B1 | 11/2013 | Ortenberg et al. |
| 8,583,607 B1 | 11/2013 | Chen et al. |
| 8,600,943 B1 | 12/2013 | Fitzgerald et al. |
| 8,677,087 B2 | 3/2014 | Meiri et al. |
| 8,683,153 B1 | 3/2014 | Long et al. |
| 8,694,700 B1 | 4/2014 | Natanzon et al. |
| 8,706,959 B1 | 4/2014 | Arnon et al. |
| 8,712,976 B1 | 4/2014 | Chen et al. |
| 8,719,497 B1 | 5/2014 | Don et al. |
| 8,732,124 B1 | 5/2014 | Arnon et al. |
| 8,775,388 B1 | 7/2014 | Chen et al. |
| 8,782,324 B1 | 7/2014 | Chen et al. |
| 8,782,357 B2 | 7/2014 | Halstead et al. |
| 8,799,601 B1 | 8/2014 | Chen et al. |
| 8,812,595 B2 | 8/2014 | Meiri et al. |
| 8,825,964 B1 | 9/2014 | Sopka et al. |
| 8,838,849 B1 | 9/2014 | Meiri et al. |
| 8,862,546 B1 | 10/2014 | Natanzon et al. |
| 8,909,887 B1 | 12/2014 | Armangau et al. |
| 8,914,596 B2 | 12/2014 | Lecrone et al. |
| 8,930,746 B1 | 1/2015 | Chen et al. |
| 8,954,699 B1 | 2/2015 | Chen et al. |
| 8,966,211 B1 | 2/2015 | Arnon et al. |
| 8,977,812 B1 | 3/2015 | Chen et al. |
| 8,977,826 B1 | 3/2015 | Meiri et al. |
| 8,984,241 B2 | 3/2015 | Aizman |
| 9,002,904 B1 | 4/2015 | Meiri et al. |
| 9,009,437 B1 | 4/2015 | Bjornsson et al. |
| 9,026,492 B1 | 5/2015 | Shorey et al. |
| 9,026,696 B1 | 5/2015 | Natanzon et al. |
| 9,037,816 B1 | 5/2015 | Halstead et al. |
| 9,037,822 B1 | 5/2015 | Meiri et al. |
| 9,100,343 B1 | 8/2015 | Riordan et al. |
| 9,104,326 B2 | 8/2015 | Frank et al. |
| 9,110,693 B1 | 8/2015 | Meiri et al. |
| 9,128,942 B1 | 9/2015 | Pfau et al. |
| 9,152,336 B1 | 10/2015 | Chen et al. |
| 9,208,162 B1 | 12/2015 | Hallak et al. |
| 9,270,592 B1 | 2/2016 | Sites |
| 9,286,003 B1 | 3/2016 | Hallak et al. |
| 9,304,889 B1 | 4/2016 | Chen et al. |
| 9,323,750 B2 | 4/2016 | Natanzon et al. |
| 9,330,048 B1 | 5/2016 | Bhatnagar et al. |
| 9,342,465 B1 | 5/2016 | Meiri |
| 9,355,112 B1 | 5/2016 | Armangau et al. |
| 9,378,106 B1 | 6/2016 | Ben-Moshe et al. |
| 9,384,206 B1 | 7/2016 | Bono et al. |
| 9,395,937 B1 | 7/2016 | Si et al. |
| 9,396,243 B1 | 7/2016 | Halevi et al. |
| 9,418,131 B1 | 8/2016 | Halevi et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,483,355 B1 | 11/2016 | Meiri et al. |
| 9,513,814 B1 | 12/2016 | Can et al. |
| 9,524,220 B1 | 12/2016 | Veprinsky et al. |
| 9,529,545 B1 | 12/2016 | Bono et al. |
| 9,542,125 B1 | 1/2017 | Chen |
| 9,558,083 B2 | 1/2017 | LeCrone et al. |
| 9,563,683 B2 * | 2/2017 | Abercrombie ...... G06F 12/0253 |
| 9,594,514 B1 | 3/2017 | Bono et al. |
| 9,606,739 B1 | 3/2017 | LeCrone et al. |
| 9,606,870 B1 | 3/2017 | Meiri et al. |
| 9,684,593 B1 | 6/2017 | Chen et al. |
| 9,710,187 B1 | 7/2017 | Si et al. |
| 9,753,663 B1 | 9/2017 | LeCrone et al. |
| 9,762,460 B2 | 9/2017 | Pawlowski et al. |
| 9,769,254 B2 | 9/2017 | Gilbert et al. |
| 9,785,468 B2 | 10/2017 | Mitchell et al. |
| 9,811,288 B1 | 11/2017 | Chen et al. |

(56) References Cited

U.S. PATENT DOCUMENTS

| | | |
|---|---|---|
| 9,817,766 B1 | 11/2017 | Si et al. |
| 9,959,063 B1 | 5/2018 | Meiri et al. |
| 9,959,073 B1 | 5/2018 | Meiri |
| 10,007,466 B1 | 6/2018 | Meiri et al. |
| 10,025,843 B1 | 7/2018 | Meiri et al. |
| 10,037,369 B1 | 7/2018 | Bono et al. |
| 10,055,161 B1 | 8/2018 | Meiri et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,152,527 B1 | 12/2018 | Meiri et al. |
| 10,176,046 B1 | 1/2019 | Hu et al. |
| 10,235,066 B1 | 3/2019 | Chen et al. |
| 2002/0056031 A1 | 5/2002 | Skiba et al. |
| 2002/0133512 A1 | 9/2002 | Milillo et al. |
| 2003/0023656 A1 | 1/2003 | Hutchison et al. |
| 2003/0079041 A1 | 4/2003 | Parrella, Sr. et al. |
| 2003/0126122 A1 | 7/2003 | Bosley et al. |
| 2003/0145251 A1 | 7/2003 | Cantrill |
| 2004/0030721 A1 | 2/2004 | Kruger et al. |
| 2004/0267835 A1 | 12/2004 | Zwilling et al. |
| 2005/0039171 A1 | 2/2005 | Avakian et al. |
| 2005/0102547 A1 | 5/2005 | Keeton et al. |
| 2005/0125626 A1 | 6/2005 | Todd |
| 2005/0144416 A1 | 6/2005 | Lin |
| 2005/0171937 A1 | 8/2005 | Hughes et al. |
| 2005/0177603 A1 | 8/2005 | Shavit |
| 2005/0193084 A1 | 9/2005 | Todd et al. |
| 2005/0278346 A1 | 12/2005 | Shang et al. |
| 2006/0031653 A1 | 2/2006 | Todd et al. |
| 2006/0031787 A1 | 2/2006 | Ananth et al. |
| 2006/0047776 A1 | 3/2006 | Chieng et al. |
| 2006/0070076 A1 | 3/2006 | Ma |
| 2006/0123212 A1 | 6/2006 | Yagawa |
| 2006/0242442 A1 | 10/2006 | Armstrong et al. |
| 2007/0078982 A1 | 4/2007 | Aidun et al. |
| 2007/0208788 A1 | 9/2007 | Chakravarty et al. |
| 2007/0297434 A1 | 12/2007 | Arndt et al. |
| 2008/0098183 A1 | 4/2008 | Morishita et al. |
| 2008/0163215 A1 | 7/2008 | Jiang et al. |
| 2008/0178050 A1 | 7/2008 | Kern et al. |
| 2008/0228772 A1 | 9/2008 | Plamondon |
| 2008/0228864 A1 | 9/2008 | Plamondon |
| 2008/0228899 A1 | 9/2008 | Plamondon |
| 2008/0228938 A1 | 9/2008 | Plamondon |
| 2008/0229017 A1 | 9/2008 | Plamondon |
| 2008/0229020 A1 | 9/2008 | Plamondon |
| 2008/0229021 A1 | 9/2008 | Plamondon |
| 2008/0229023 A1 | 9/2008 | Plamondon |
| 2008/0229024 A1 | 9/2008 | Plamondon |
| 2008/0229025 A1 | 9/2008 | Plamondon |
| 2008/0243952 A1 | 10/2008 | Webman et al. |
| 2008/0288739 A1 | 11/2008 | Bamba et al. |
| 2009/0006745 A1 | 1/2009 | Cavallo et al. |
| 2009/0030986 A1 | 1/2009 | Bates |
| 2009/0049450 A1 | 2/2009 | Dunshea et al. |
| 2009/0055613 A1 | 2/2009 | Maki et al. |
| 2009/0089483 A1 | 4/2009 | Tanaka et al. |
| 2009/0100108 A1 | 4/2009 | Chen et al. |
| 2009/0222596 A1 | 9/2009 | Flynn et al. |
| 2009/0319996 A1 | 12/2009 | Shafi et al. |
| 2010/0042790 A1 | 2/2010 | Mondal et al. |
| 2010/0088296 A1 | 4/2010 | Periyagaram et al. |
| 2010/0180145 A1 | 7/2010 | Chu |
| 2010/0199066 A1 | 8/2010 | Artan et al. |
| 2010/0205330 A1 | 8/2010 | Noborikawa et al. |
| 2010/0223619 A1 | 9/2010 | Jaquet et al. |
| 2010/0257149 A1 | 10/2010 | Cognigni et al. |
| 2011/0060722 A1 | 3/2011 | Li et al. |
| 2011/0078494 A1 | 3/2011 | Maki et al. |
| 2011/0083026 A1 | 4/2011 | Mikami et al. |
| 2011/0099342 A1 | 4/2011 | Ozdemir |
| 2011/0119679 A1 | 5/2011 | Muppirala et al. |
| 2011/0161297 A1 | 6/2011 | Parab |
| 2011/0202744 A1 | 8/2011 | Kulkarni et al. |
| 2011/0225122 A1 | 9/2011 | Denuit et al. |
| 2011/0289291 A1 | 11/2011 | Agombar et al. |
| 2012/0054472 A1 | 3/2012 | Altman et al. |
| 2012/0059799 A1 | 3/2012 | Oliveira et al. |
| 2012/0078852 A1 | 3/2012 | Haselton et al. |
| 2012/0124282 A1 | 5/2012 | Frank et al. |
| 2012/0158736 A1 | 6/2012 | Milby |
| 2012/0254131 A1* | 10/2012 | Al Kiswany ......... G06F 16/188 707/692 |
| 2012/0278793 A1 | 11/2012 | Jalan et al. |
| 2012/0290546 A1 | 11/2012 | Smith et al. |
| 2012/0290798 A1 | 11/2012 | Huang et al. |
| 2012/0304024 A1 | 11/2012 | Rohleder et al. |
| 2013/0031077 A1 | 1/2013 | Liu et al. |
| 2013/0054524 A1 | 2/2013 | Anglin et al. |
| 2013/0073527 A1 | 3/2013 | Bromley |
| 2013/0110783 A1 | 5/2013 | Wertheimer et al. |
| 2013/0111007 A1 | 5/2013 | Hoffmann et al. |
| 2013/0138607 A1 | 5/2013 | Bashyam et al. |
| 2013/0151683 A1 | 6/2013 | Jain et al. |
| 2013/0151759 A1 | 6/2013 | Shim et al. |
| 2013/0166549 A1 | 6/2013 | Goldman et al. |
| 2013/0198854 A1 | 8/2013 | Erway et al. |
| 2013/0246354 A1 | 9/2013 | Clayton et al. |
| 2013/0246724 A1 | 9/2013 | Furuya |
| 2013/0265883 A1 | 10/2013 | Henry et al. |
| 2013/0282997 A1 | 10/2013 | Suzuki et al. |
| 2013/0318051 A1 | 11/2013 | Kumar et al. |
| 2013/0318221 A1 | 11/2013 | Anaya et al. |
| 2013/0332610 A1 | 12/2013 | Beveridge |
| 2014/0040199 A1 | 2/2014 | Golab et al. |
| 2014/0040343 A1 | 2/2014 | Nickolov et al. |
| 2014/0108727 A1 | 4/2014 | Sakashita et al. |
| 2014/0136759 A1 | 5/2014 | Sprouse et al. |
| 2014/0143206 A1* | 5/2014 | Pittelko ............... G06F 11/1448 707/634 |
| 2014/0161348 A1 | 6/2014 | Sutherland et al. |
| 2014/0195484 A1 | 7/2014 | Wang et al. |
| 2014/0237201 A1 | 8/2014 | Swift |
| 2014/0279884 A1 | 9/2014 | Dantkale et al. |
| 2014/0297588 A1 | 10/2014 | Babashetty et al. |
| 2014/0359231 A1 | 12/2014 | Matthews |
| 2014/0380005 A1 | 12/2014 | Furuya |
| 2014/0380282 A1 | 12/2014 | Ravindranath Sivalingam et al. |
| 2015/0006910 A1 | 1/2015 | Shapiro |
| 2015/0032696 A1* | 1/2015 | Camble ............... G06F 11/1456 707/634 |
| 2015/0088823 A1 | 3/2015 | Chen et al. |
| 2015/0112933 A1 | 4/2015 | Satapathy |
| 2015/0134723 A1 | 5/2015 | Kansal et al. |
| 2015/0149739 A1 | 5/2015 | Seo et al. |
| 2015/0161194 A1 | 6/2015 | Provenzano et al. |
| 2015/0200833 A1* | 7/2015 | Cutforth ............. H04L 67/1097 709/224 |
| 2015/0205816 A1 | 7/2015 | Periyagaram et al. |
| 2015/0249615 A1 | 9/2015 | Chen et al. |
| 2015/0324236 A1 | 11/2015 | Gopalan et al. |
| 2015/0370488 A1 | 12/2015 | Watanabe et al. |
| 2016/0034692 A1 | 2/2016 | Singler |
| 2016/0042285 A1 | 2/2016 | Gilenson et al. |
| 2016/0062853 A1 | 3/2016 | Sugabrahmam et al. |
| 2016/0080482 A1 | 3/2016 | Gilbert et al. |
| 2016/0188419 A1 | 6/2016 | Dagar et al. |
| 2016/0350391 A1 | 12/2016 | Vijayan et al. |
| 2016/0359968 A1 | 12/2016 | Chitti et al. |
| 2016/0366206 A1 | 12/2016 | Shemer et al. |
| 2017/0091246 A1* | 3/2017 | Risvik .................. G06F 16/182 |
| 2017/0123704 A1 | 5/2017 | Sharma et al. |
| 2017/0139786 A1 | 5/2017 | Simon et al. |
| 2017/0161348 A1 | 6/2017 | Araki et al. |
| 2017/0201602 A1 | 7/2017 | Harnik et al. |

FOREIGN PATENT DOCUMENTS

| | | |
|---|---|---|
| WO | WO 2010/040078 | 4/2010 |
| WO | WO 2012/066528 | 5/2012 |

(56) References Cited

OTHER PUBLICATIONS

Response to Office Action dated Dec. 6, 2018 for U.S. Appl. No. 15/076,946, filed Jan. 23, 2019; 9 Pages.
Office Action dated Nov. 1, 2017 corresponding to U.S. Appl. No. 15/196,374, 64 Pages.
U.S. Non-Final Office Action dated Jul. 6, 2017 for U.S. Appl. No. 14/494,895; 36 Pages.
U.S. Appl. No. 15/196,674, filed Jun. 29, 2016, Kleiner, et al.
U.S. Appl. No. 15/196,427, filed Jun. 29, 2016, Shveidel.
U.S. Appl. No. 15/196,374, filed Jun. 29, 2016, Shveidel, et al.
U.S. Appl. No. 15/196,447, filed Jun. 29, 2016, Shveidel, et al.
U.S. Appl. No. 15/196,472, filed Jun. 29, 2016, Shveidel.
Response to U.S. Non-Final Office Action dated Dec. 14, 2017 for U.S. Appl. No. 15/076,946; Response filed on Mar. 14, 2018; 11 pages.
Response to U.S. Non-Final Office Action dated Dec. 11, 2017 for U.S. Appl. No. 15/196,447; Response filed on Mar. 12, 2018; 12 pages.
Response to U.S. Non-Final Office Action dated Jul. 6, 2017 for U.S. Appl. No. 14/494,895; Response filed Oct. 3, 2017; 10 Pages.
U.S. Non-Final Office Action dated Jan. 11, 2018 corresponding to U.S. Appl. No. 15/085,168; 14 Pages.
U.S. Non-Final Office Action dated Dec. 29, 2017 corresponding to U.S. Appl. No. 15/196,674; 34 Pages.
U.S. Non-Final Office Action dated Jan. 8, 2018 corresponding to U.S. Appl. No. 15/196,472; 16 Pages.
U.S. Notice of Allowance dated Jan. 26, 2018 corresponding to U.S. Appl. No. 15/085,172; 8 Pages.
U.S. Notice of Allowance dated Jan. 24, 2018 corresponding to U.S. Appl. No. 15/085,181; 8 Pages.
Response to U.S. Non-Final Office Action dated Nov. 1, 2017 corresponding to U.S. Appl. No. 15/196,374; Response Filed Jan. 30, 2018; 14 Pages.
Response filed on May 2, 2016 to the Non-Final Office Action dated Dec. 1, 2015; for U.S. Appl. No. 14/230,405; 8 pages.
Response filed on May 2, 2016 to the Non-Final Office Action dated Feb. 4, 2016; for U.S. Appl. No. 14/037,577; 10 pages.
U.S. Appl. No. 16/050,247, filed Jul. 31, 2018, Schneider et al.
U.S. Appl. No. 16/177,782, filed Nov. 1, 2018, Hu et al.
U.S. Appl. No. 16/264,825, filed Feb. 1, 2019, Chen et al.
U.S. Appl. No. 16/263,414, filed Jan. 31, 2019, Meiri et al.
U.S. Appl. No. 15/001,789, filed Jan. 20, 2016, Meiri et al.
U.S. Appl. No. 15/076,775, filed Mar. 22, 2016, Chen et al.
U.S. Appl. No. 15/076,946, filed Mar. 22, 2016, Meiri.
U.S. Appl. No. 15/499,297, filed Apr. 27, 2017, Kucherov et al.
U.S. Appl. No. 15/499,303, filed Apr. 27, 2017, Kucherov et al.
U.S. Appl. No. 15/499,226, filed Apr. 27, 2017, Meiri et al.
U.S. Appl. No. 15/499,199, filed Apr. 27, 2017, Stronge et al.
U.S. Appl. No. 15/797,329, filed Oct. 30, 2017, Parasnis et al.
U.S. Appl. No. 15/971,153, filed May 4, 2018, Meiri et al.
U.S. Appl. No. 15/971,310, filed May 4, 2018, Kucherov et al.
U.S. Appl. No. 15/971,325, filed May 4, 2018, Kucherov et al.
U.S. Appl. No. 15/971,445, filed May 4, 2018, Kucherov et al.
U.S. Appl. No. 16/048,767, filed Jul. 30, 2018, Chen et al.
U.S. Appl. No. 16/169,202, filed Oct. 24, 2018, Chen et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 15/499,943, filed Apr. 28, 2017, Kucherov et al.
U.S. Appl. No. 15/499,935, filed Apr. 28, 2017, Chen et al.
U.S. Appl. No. 15/499,949, filed Apr. 28, 2017, Chen et al.
U.S. Appl. No. 15/499,947, filed Apr. 28, 2017, Kucherov et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 15/885,027, filed Jan. 31, 2018, Chen et al.
U.S. Appl. No. 16/042,363, filed Jul. 23, 2018, Chen et al.
U.S. Appl. No. 16/038,543, filed Jul. 18, 2018, Chen et al.
Final Office Action dated Jun. 13, 2018 for U.S. Appl. No. 15/076,946; 29 pages.
U.S. Notice of Allowance dated May 9, 2018 for U.S. Appl. No. 15/196,447; 12 Pages.
Feng et al., "eMuse: QoS Guarantees for Shared Storage Servers;" $22^{nd}$ International Conference on Advanced Information Networking and Applications—Workshops; Mar. 25, 2008; 6 Pages.
Schaelicke et al. "Improving I/O Performance with a Conditional Store Buffer;" $31^{st}$ Annual ACM/IEEE International Symposium on Microarchitecture; Dec. 2, 1998; 10 Pages.
Ye et al., "Buffering and Flow Control in Optical Switches for High Performance Computing;" IEEE/OSA Journal of Optical Communications and Networking, vol. 3, No. 8; Aug. 2011; 14 Pages.
Zhang et al., "Storage Performance Virtualization via Throughput and Latency Control;" Proceedings of the $13^{th}$ IEEE International Symposium on Modeling, Analysis, and Simulation of Computer and Telecommunication Systems (MASCOTS '05); Sep. 27, 2005; 8 Pages.
Response to U.S. Final Office Action dated Apr. 6, 2016 corresponding to U.S. Appl. No. 14/034,981; Response filed on Jun. 16, 2016; 11 Pages.
Notice of Allowance dated Jun. 29, 2016 corresponding to U.S. Appl. No. 14/034,981; 14 Pages.
Response to U.S. Office Action dated Feb. 4, 2016 corresponding to U.S. Appl. No. 14/037,577; Response filed on May 2, 2016; 10 Pages.
Notice of Allowance dated May 20, 2016 corresponding to U.S. Appl. No. 14/037,577; 19 Pages.
Notice of Allowance dated Jun. 6, 2016 corresponding to U.S. Appl. No. 14/317,449; 43 Pages.
U.S. Final Office Action dated Nov. 2, 2017 for U.S. Appl. No. 14/494,895; 12 Pages.
U.S. Appl. No. 14/034,981, filed Sep. 24, 2013, Halevi et al.
U.S. Appl. No. 14/037,577, filed Sep. 26, 2013, Ben-Moshe at al.
U.S. Appl. No. 14/230,405, filed Mar. 31, 2014, Meiri et al.
U.S. Appl. No. 14/230,414, filed Mar. 31, 2014, Meiri.
U.S. Appl. No. 14/317,449, filed Jun. 27, 2014, Halevi et al.
U.S. Appl. No. 14/494,895, filed Sep. 24, 2014, Meiri et al.
U.S. Appl. No. 14/494,899, filed Sep. 24, 2014, Chen et al.
U.S. Appl. No. 14/979,890, filed Dec. 28, 2015, Meiri et al.
U.S. Appl. No. 15,001,784, filed Jan. 20, 2016, Meiri et al.
U.S. Appl. No. 15/085,168, filed Mar. 30, 2016, Meiri et al.
U.S. Appl. No. 15/085,172, filed Mar. 30, 2016, Meiri.
U.S. Appl. No. 15/085,181, filed Mar. 30, 2016, Meiri et al.
PCT International Search Report and Written Opinion dated Dec. 1, 2011 for PCT Application No. PCT/IL2011/000692; 11 Pages.
PCT International Preliminary Report dated May 30, 2013 for PCT Patent Application No. PCT/IL2011/000692; 7 Pages.
U.S. Appl. No. 12/945,915; 200 Pages.
U.S. Appl. No. 12/945,915; 108 Pages.
U.S. Appl. No. 12/945,915; 67 Pages.
Nguyen et al., "B+ Hash Tree: Optimizing Query Execution Times for on-Disk Semantic Web Data Structures;" Proceedings of the $6^{th}$ International Workshop on Scalable Semantic Web Knowledge Base Systems; Shanghai, China, Nov. 8, 2010; 16 Pages.
Notice of Allowance dated Apr. 13, 2015 corresponding to U.S. Appl. No. 14/037,511; 11 Pages.
Non-Final Office Action dated May 11, 2015 corresponding to U.S. Appl. No. 14/037,626; 13 Pages.
Response to Office Action dated May 11, 2015 corresponding to U.S. Appl. No. 14/037,626; Response filed on Jul. 20, 2015; 10 Pages.
Notice of Allowance dated Oct. 26, 2015 corresponding to U.S. Appl. No. 14/037,626; 12 Pages.
Office Action dated Jul. 22, 2015 corresponding to U.S. Appl. No. 14/034,981; 28 Pages.
Response to Office Action dated Jul. 22, 2015 corresponding to U.S. Appl. No. 14/034,981; Response filed on Dec. 22, 2015; 14 Pages.

(56) References Cited

OTHER PUBLICATIONS

Office Action dated Sep. 1, 2015 corresponding to U.S. Appl. No. 14/230,414; 13 Pages.
Response to Office Action dated Sep. 1, 2015 corresponding to U.S. Appl. No. 14/230,414; Response filed on Jan. 14, 2016; 10 Pages.
Restriction Requirement dated Sep. 24, 2015 corresponding to U.S. Appl. No. 14/230,405; 8 Pages.
Response to Restriction Requirement dated Sep. 24, 2015 corresponding to U.S. Appl. No. 14/230,405; Response filed Oct. 6, 2015; 1 Page.
Office Action dated Dec. 1, 2015 corresponding to U.S. Appl. No. 14/230,405; 17 Pages.
Office Action dated Feb. 4, 2016 corresponding to U.S. Appl. No. 14/037,577; 26 Pages.
Notice of Allowance dated Feb. 10, 2016 corresponding to U.S. Appl. No. 14/494,899; 19 Pages.
Notice of Allowance dated Feb. 26, 2016 corresponding to U.S. Appl. No. 14/230,414; 8 Pages.
Final Office Action dated Apr. 6, 2016 corresponding to U.S. Appl. No. 14/034,981; 38 Pages.
Notice of Allowance and Issue Fee due dated Apr. 18, 2019 for U.S. Appl. No. 15/076,946; 11 Pages.
Non-Final Office Action dated Dec. 6, 2018 for U.S. Appl. No. 15/076,946; 27 Pages.
U.S. Non-Final Office Action dated Dec. 1, 2017 for U.S. Appl. No. 14/979,890; 10 Pages.
U.S. Non-Final Office Action dated Dec. 11, 2017 for U.S. Appl. No. 15/196,447; 54 Pages.
U.S. Non-Final Office Action dated Dec. 14, 2017 for U.S. Appl. No. 15/076,946; 28 Pages.

* cited by examiner

200

ADAPTIVE HASH-BASED DATA REPLICATION IN A STORAGE SYSTEM

BACKGROUND

Computer data is increasingly vital to modern organizations, and protecting against data loss in the event of a system failure is an increasingly important organization objective. Data protection systems for storing organizational source (e.g., production) site data on a periodic basis suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself is both time consuming and can consume system resources.

Some data protection systems use data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for performing hash-based data replication in a storage system. The hash-based data replication may replicate selected data from a source device to a target device of the storage system. One or more operating conditions of the storage system may be determined. Based upon the determined operating conditions, one or more configuration settings of data replication operations may be set. The data replication operation may be initiated for the selected data, and may send, based upon the one or more configuration settings, at least one of (i) a hash value associated with the selected data to the one or more target devices, and (ii) the selected data to the one or more target devices.

Another aspect may provide a system including a processor and memory with stored computer program code that when executed on the processor may cause the processor to execute a hash-based data replication process associated with at least one source device and at least one target device in a storage system. The hash-based data replication may replicate selected data from a source device to a target device of the storage system. The processor may perform the operations of determining one or more operating conditions of the storage system and setting, based upon the determined one or more operating conditions, one or more configuration settings of a data replication operation of the storage system. The data replication operation for the selected data may be initiated. The data replication operation may send, based upon the one or more configuration settings, at least one of (i) a hash value associated with the selected data to the one or more target devices, and (ii) the selected data to the one or more target devices.

Another aspect may provide a computer program product including a non-transitory computer readable storage medium having computer program code encoded thereon that when executed on a processor of a computer may cause the computer to execute a hash-based data replication process associated with at least one source device and at least one target device in a storage system. The hash-based data replication may replicate selected data from a source device to a target device of the storage system. The computer program product may include computer program code for determining one or more operating conditions of the storage system and setting, based upon the determined one or more operating conditions, one or more configuration settings of a data replication operation of the storage system. The data replication operation for the selected data may be initiated. The data replication operation may send, based upon the one or more configuration settings, at least one of (i) a hash value associated with the selected data to the one or more target devices, and (ii) the selected data to the one or more target devices.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
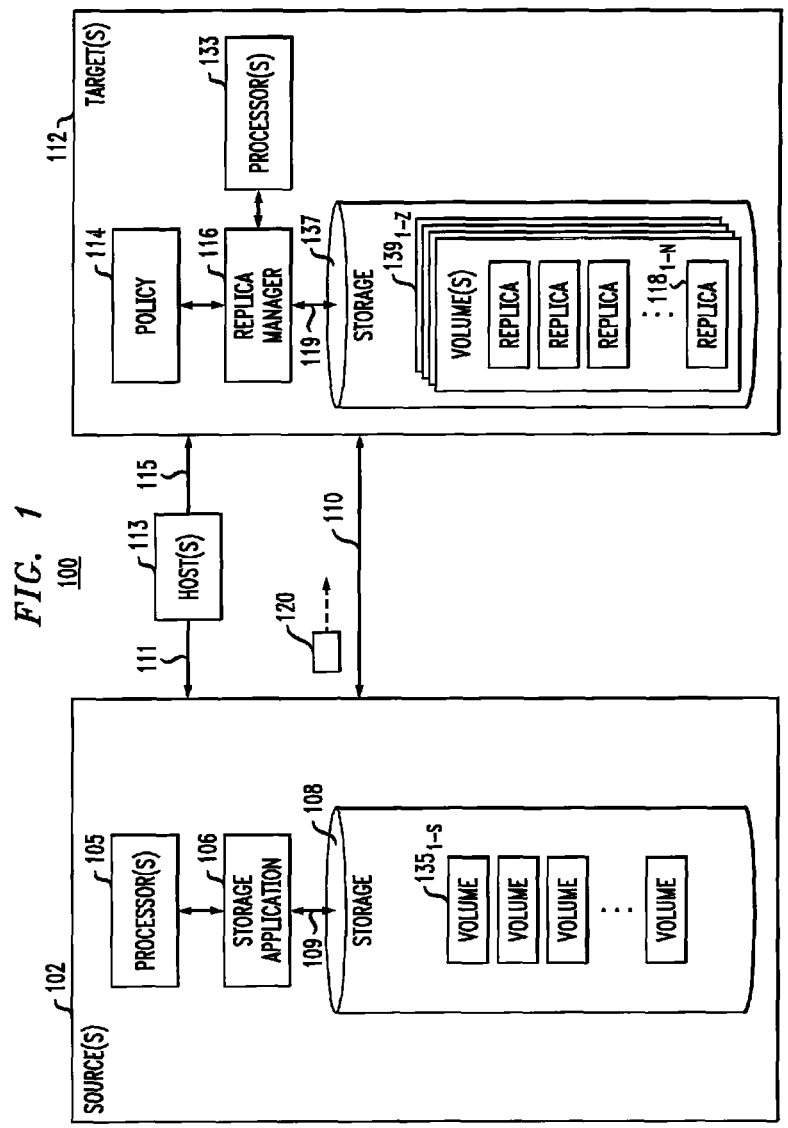
FIG. 1 is a block diagram of an example of a storage system to perform data replication from a source to a target in accordance with an illustrative embodiment.

FIG. 1 shows an example storage system 100. In accordance with illustrative embodiments, storage system 100 may perform hash-based asynchronous data replication cycles at time-based intervals and may perform hash-based synchronous data replication cycles as data is changed on a source site (e.g., 102).

Storage system 100 may include at least one source site 102 and at least one target site 112, which may be co-located or geographically separated. Source site 102 may include one or more processors 105, storage application 106, and storage 108. In some embodiments, storage 108 may include one or more storage volumes $135_{1-S}$, that operate as active or production volumes. Target site 112 may include hash-based replica manager 116 that manages a plurality of replicas $118_{1-N}$ (generally referred to herein as replicas 118) according to a policy 114 (e.g., a replication and/or retention policy). Replicas 118 may be stored in one or more volumes $139_{1-Z}$ of storage 137 of target site 112. Target site 112 may also include one or more processors 133. Source site 102 and target site 112 may be in communication with one or more hosts 113 via communication links 111 and 115, respectively.

Hosts 113 may perform input/output (I/O) operations on source-side storage 108 (e.g., read data from and write data to storage 108). In some embodiments, the I/O operations may be intercepted by and controlled by storage application 106. As changes are made to data stored on storage 108 via the I/O operations from hosts 113, or over time as storage system 100 operates, storage application 106 may perform data replication 120 from source site 102 to target site 112 over communication link 110. In some embodiments, communication link 110 may be a long distance communication link of a storage area network (SAN), such as an Ethernet or Internet (e.g., TCP/IP) link that may employ, for example, the iSCSI protocol. In some embodiments, target site 112 may include internal (e.g., short distance) communication links (not shown) to transfer data between storage volumes for storing replicas $118_{1-N}$, such as an InfiniBand (IB) link or Fibre Channel (FC) link.

In illustrative embodiments, storage system 100 may employ a snapshot (or replication) mechanism to replicate data between source site 102 and target site 112. A replica (or snapshot) may be created from data within storage 108 and transferred to one or more target site 112 during a data replication cycle by hash-based data replication 120. Hash-based data replication 120 may be performed based on data replication policies that may define various settings for data recovery operations, shown as policy 114. For example, policy 114 may define a plurality of attributes, such as a frequency with which replicas 118 are generated and how long each replica 118 is kept at target site 112. In some embodiments, one or both of storage application 106 and/or replica manager 116 may also define a remote replica lag (e.g., the length of time during which updates may be lost in case of a failure of source site 102), a recovery point objective (RPO) (e.g., a maximum acceptable lag time between the time data is committed to source site 102 and the time the data is committed to target site 112 or an acceptable amount of data loss measured in time), a recovery time objective (RTO) (e.g., the time taken to perform the recovery), the mode of replication (e.g., synchronous, asynchronous, continuous data protection (CDP), point in time (PIT), and so forth), and/or other attributes. For example, in one embodiment, storage application 106 may define the remote replica lag, RPO, RTO, and/or other attributes, and policy 114 and replica manager 116 may define the retention policy. In some embodiments, policy 114 may define the remote replica lag, RPO, RTO, retention policy, and/or other attributes.

As described herein, in example embodiments, hash-based data replication 120 may be asynchronous data replication performed at time-based intervals during operation of storage system 100. The timing of asynchronous replication cycles and the retention of the replicas 118 may be managed by one or both of storage application 106 of source site 102 and/or hash-based replica manager 116 of target site 112. In one embodiment, storage application 106 of source site 102 may define the timing of asynchronous replication cycles, and the retention may be defined by policy 114. Hash-based data replication 120 may alternatively be synchronous data replication performed when data is changed on source site 102.

For example, asynchronous data replication may periodically generate snapshots (or replicas), scan and compare the snapshots to determine changes in data between the snapshots, and transfer the data difference to target site 112. The frequency with which to perform replication cycles may be determined by a recovery point objective (RPO) and/or retention policy settings of policy 114. For example, policy 114 may define an RPO setting of x seconds, where x may be a positive integer, to ensure that the most recent available replica 118 stored on target site 112 reflects the state of data stored on source site 102 no longer than x seconds ago. Policy 114 may also determine how many replicas 118 should be maintained, at what time (e.g., what time of day, week, month, etc.), and for what duration.

Storage system 100 may employ hash operations to generate hash values associated with data of hash-based data replication operation 120. For example, storage system 100 may operate as a flash storage array, a content addressable storage system or a deduplication device. In some embodiments, storage 108 may save a block of data as a hash, or as a reference to a block of data stored at another location or volume. The blocks of data may be, for example, 8 kb in size. In some embodiments, the hash may be generated as a Secure Hash Algorithm hash (e.g., SHA-1, SHA-2, SHA-3, or similar hashes). In one example, storage 108 may be a deduplicated storage array, such as XtremIO by EMC Corporation of Hopkinton, Mass., so that each of the data in the storage array may be kept in two (or more) separate levels. In a first level, each volume contains address-to-hash mapping, which may be kept in a compact format. A second level of mapping may be a map from hash-to-the physical location where the data matching the hash value is stored.

For example, some embodiments of storage system 100 may store data in fixed-size chunks, for example 4 KB chunks, where each chunk may have an associated unique hash value. In such embodiments, storage system 100 may be configured to maintain a mapping between I/O (or logical) addresses associated with data and the hash values, and also to maintain a mapping between the hash values and physical storage addresses of the data. These mappings may be maintained using one or more address-to-hash ("A2H") tables and/or one or more hash-to-physical address ("H2P") tables. It will be appreciated that combinations of the A2H and H2P tables may provide multiple levels of indirection between the logical (or "I/O") address used to access data and the physical address where that data is stored. Among other advantages, this may allow storage system 100 freedom to move data within storage 108. For example, illustrative embodiments may operate such as described in U.S. Pat. No. 9,104,326, issued Aug. 11, 2015, which is assigned to the same assignee as this patent application and is incorporated herein by reference in its entirety.

During hash-based data replication operation 120, storage system 100 may attempt to send hash values instead of the full data of the data replication operation. This can reduce data transmitted if all or some of the data of the data replication operation is already stored on target site 112. For example, storage system 100 may determine that the hash value is already stored on target site 112 (e.g., a hash hit). In instances where storage system 100 determines a hash hit, full block data associated with hash-based data replication operation 120 may not be sent from source site 102 to target site 112, since the data is already stored on target site 112. Alternatively, storage system 100 may determine that the hash value is not already stored on target site 112 (e.g., a hash miss). In instances where storage system 100 determines a hash miss, full block data associated with data replication operation 120 may be sent from source site 102 to target site 112.

For certain types of data, such as virtualized systems and other systems having relatively significant data deduplication, the likelihood of having data already stored on the target (e.g., having a hash hit) is relatively high. For other types of data, such as databases and other systems having relatively little data deduplication, the likelihood of having data already stored on the target (e.g., having a hash hit) is relatively low. Described embodiments of storage system 100 may provide an automated and adaptive way of recognizing the scenarios having a high/low likelihood of having a hash hit, by performing dynamic adaptation of settings of hash-based data replication operation 120, per volume, during operation of storage system 100.

Figure 2:
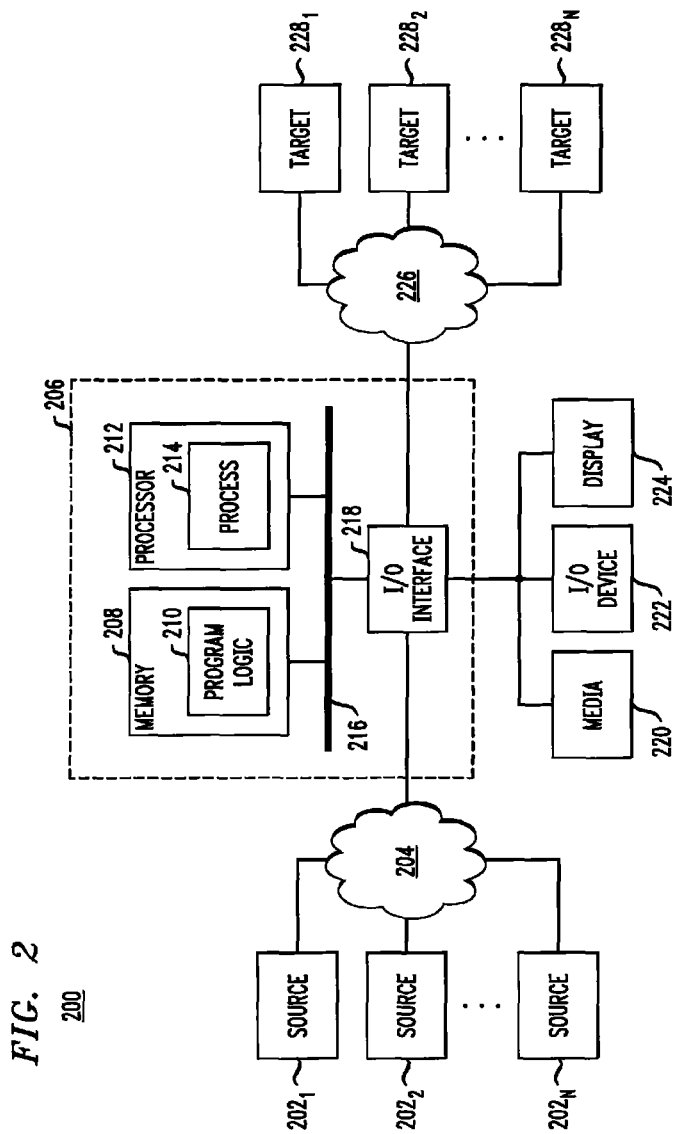
FIG. 2 is a block diagram of another example of a storage system to perform data replication from a source to a target in accordance with an illustrative embodiment.

Referring to FIG. 2, in an illustrative embodiment, apparatus 206 may form part of system 200 and include memory 208 storing program logic 210, processor 212 for executing process 214, and communications I/O interface 218, connected via a bus 216 to allow communication between memory 208, processor 212 and devices external to apparatus 206. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_X$ via network 204. In some embodiments, communications I/O interface 218 may couple apparatus 206 to one or more target devices $228_1$-$228_Y$ via network 226. In some embodiments, network 226 of FIG. 2 may be a communication fabric between volumes of targets 228. For example, in some embodiments, network 226 may be an InfiniBand (IB) network or a Fibre Channel (FC) network. Further, in an illustrative embodiment, apparatus 206 may be implemented as part of host 104 of FIG. 1.

Figure 3:
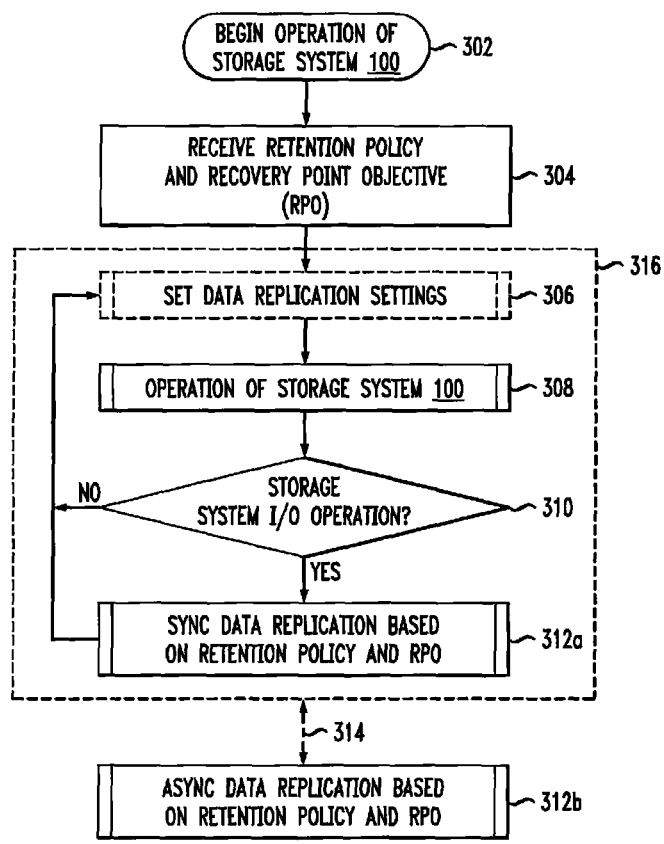
FIG. 3 is a flow diagram of an example of a process to perform data replication from a source to a target in accordance with an illustrative embodiment.

Referring to FIG. 3, process 300 is an example of a process to operate at least part of storage system 100 in accordance with illustrative embodiments. At block 302, operation of storage system 100 begins, for example when storage system 100 is first powered on. At block 304, storage system 100 may receive the retention policy and the recovery point objective (RPO), for example as set in policy 114 by a user of storage system 100. At block 306, one or more settings are set for data replication operations of storage system 100. Block 306 will be described in greater detail in conjunction with FIG. 4. In some embodiments, block 306 may be repeated during operation of storage system 100. At block 308, storage system 100 operates, for example by performing host read operations from and host write operations to one or more volumes of storage 108. At block 310, as data on storage 108 may be modified by system I/O operations (e.g., write operations, read-modify-write operations, etc.), at block 312a, synchronous data replication operations (e.g., "sync" data replication operations) may be performed to create and store replicas on target devices 112. Process 300 may return to block 306 to update data replication settings of storage system 100.

As indicated by dashed block 316, blocks 306, 308, 310 and 312 may be performed one or more times before an asynchronous data replication operation is performed at block 312b. Asynchronous data replication operations (e.g., "async" data replication operations) may be performed to create and store replicas on target devices 112. As indicated by dashed line 314, block 316 and block 312b may be performed in parallel during operation of storage system 100. As described herein, the timing of performing asynchronous data replication 312b may be determined, at least in part, by settings of the retention policy and RPO received at block 304. Block 316 may operate continuously, with block 312b operating periodically, during operation of storage system 100. Blocks 312a and 312b will be described in greater detail in conjunction with FIG. 5

Figure 4:
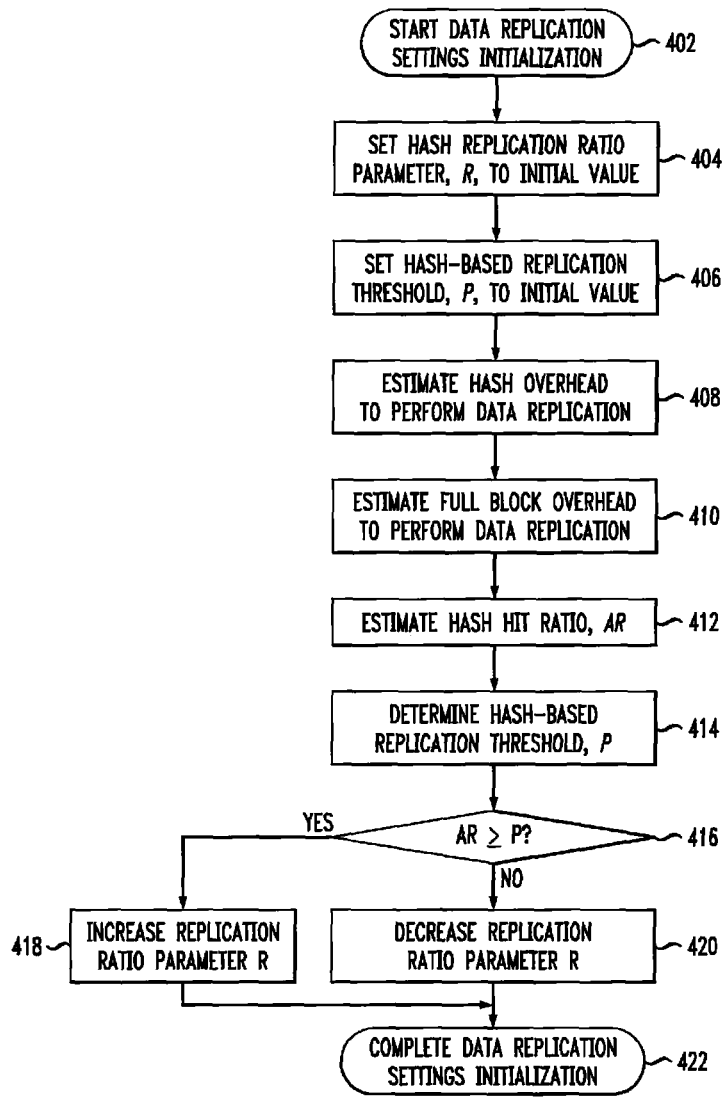
FIG. 4 is a flow diagram of an example of a process to initialize settings for the data replication process of FIG. 3.

Referring to FIG. 4, process 306' is an example of a process to perform data replication setting initialization operation of block 306 of FIG. 3, in accordance with illustrative embodiments. At block 402, process 306' starts. At block 404, a hash replication ratio parameter, R, may be set to an initial value. In some embodiments, hash replication ratio parameter, R, determines a percentage of pages for which hash-based data replication will be attempted. For example, the value of R may be a value between 0 and 100 percent. In an illustrative embodiment, the value of R may be set to either 0.1% or 100%. In such an embodiment, since R is always a non-zero value, at least some data blocks are transmitted employing hash-based data replication regardless the setting of R.

At block 406, a hash-based replication threshold, P, may be set to an initial value. Hash-based replication threshold, P, may depend on system operating conditions, such as processor load and available communications link bandwidth. For example, when the processor load is high, P may be set to a higher value in order to reduce processor utilization at the expense of using additional link bandwidth by reducing the number of data replication operations for which hash values are generated. Alternatively, if the available communications link bandwidth is low, P may be set to a lower value in order to reduce link utilization by increasing the number of data replication operations for which hash values are generated and reduce the number of data replication operations for which full data blocks are sent.

At block 408, the hash overhead may be determined that is required to perform data replication based on the settings of R and P. For example, the hash overhead may include system operating conditions of storage system 100, such as a processor load percentage and a communications link bandwidth required to perform data replication based on the settings of R and P. At block 410, the full block overhead may be determined that is required to perform data replication by sending full block data. For example, the full block overhead may include system operating conditions of storage system 100, such as a processor load percentage and a communications link bandwidth required to perform data replication by sending full block data instead of hash values.

At block 412, a hash hit ratio, AR, may be determined. In some embodiments, the hash hit ratio AR may be an estimated value based on an expected number of hash hits (e.g., an expected number or percentage of data blocks that are already stored on the target and, therefore, do not need full data block transmission). In some embodiments, the hash hit ratio AR may be an actual hash hit ratio tracked over time of operation of storage system 100 (e.g., a running number or percentage of data blocks that actually have already been stored on the target for data replication operations performed by storage system 100). At block 414, the value of hash-based replication threshold, P, may be adjusted based on the hash overhead determined at block 408, the full block overhead determined at block 410 and the estimated hash hit ratio, AR, determined at block 412.

At block 416, storage system 100 may determine whether the hash hit ratio AR has reached the hash-based replication threshold, P. In an illustrative embodiment, at block 416 storage system 100 may determine whether the hash hit ratio AR is greater than or equal to the hash-based replication threshold, P. As described, in some embodiments, the hash hit ratio AR is updated periodically during operation of storage system 100. For example, the hash hit ratio AR may be updated once every minute. If, at block 416, the hash hit ratio AR has reached the hash-based replication threshold, P, then process 306' proceeds to block 418. At block 418, the hash replication ratio parameter, R, may be increased. In an illustrative embodiment, hash replication ratio parameter, R, may be set to 100%, although other embodiments may use additional intermediate values. If, at block 416, the hash hit ratio AR has not reached the hash-based replication threshold, P, then process 306' proceeds to block 420. At block 420, the hash replication ratio parameter, R, may be decreased. In an illustrative embodiment, hash replication ratio parameter, R, may be set to 0.1%, although other embodiments may use additional intermediate values. At block 422, process 306' completes.

In an illustrative embodiment, hash-based replication threshold, P, defines a percentage of data deduplication that justifies using hash-based data replication. For example, P=5% means that even if only 5% of data blocks (e.g., pages) are already stored on the target, hash-based data replication will be performed in order to reduce page transmission by 5%. In other words, in an example embodiment, P=5% means that the overhead required to perform hash-based data replication for the 95% of the pages that are not stored on the target and therefore have both the hash values and then also the full block data transmitted to the target, may be "worth" the 5% of data blocks for which only the hash values are sent (e.g., 5% of data blocks save communication link bandwidth). In such a case, using hash-based replication saves enough bandwidth for that 5% of data blocks by not having to send the full blocks, that the overhead required to determine the hashes for the other 95% is acceptable. Hash-based replication threshold, P, may be determined based on a ratio of the hash overhead (e.g., the system resources required to generate and send a hash value) to the full block overhead (e.g., the system resources required to send a full data block). For example, an estimated hash overhead to full block overhead ratio of 1:20 may lead to P=5%.

Figure 5:
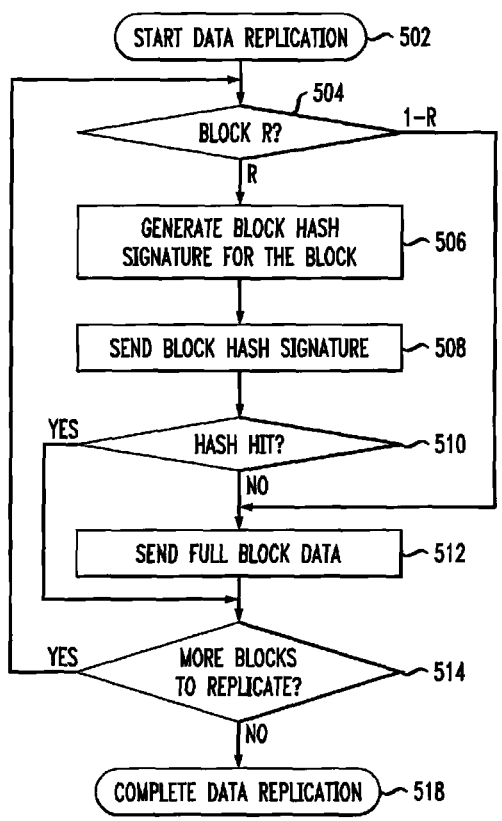
FIG. 5 is a flow diagram of an example of a process to perform the data replication process of FIG. 3.

Referring to FIG. 5, process 312' is an example of a process to perform data replication operation of blocks 312a and/or 312b of FIG. 3, in accordance with illustrative embodiments. In some embodiments, process 312' may be performed independently for every volume of storage 108 for each data replication operation. At block 502, process 312' starts.

As described herein, hash replication ratio parameter, R, may determine a percentage of pages for which hash-based data replication will be attempted. At block 504, a block of a given data replication operation has a hash generated for a percentage of pages equal to R. If, at block 504, the block corresponds to the percentage R, at block 506, a hash value (e.g., a hash signature) may be generated for one or more data blocks associated with the data replication operation. At block 508, the hash signature(s) may be transmitted from the source to the target.

At block 510, the target may determine whether there was a hash hit for the transmitted hash signature(s), where a hash hit indicates that the data blocks associated with the hash signature(s) are already stored on the target. If, at block 510, there is a hash hit, then at block 514, if there are additional data blocks to replicated, process 312' repeats at block 504 until the data blocks have been replicated. If, at block 514, there are no remaining data blocks to be replicated, then process 312' completes at block 518.

If, at block 510, there is not a hash hit, then at block 512, the full data for the block is sent from the source to the target. At block 514, if there are additional data blocks to replicated, process 312' repeats at block 504 until the data blocks have been replicated. If, at block 514, there are no remaining data blocks to be replicated, then process 312' completes at block 518.

At block 504, a block of a given data replication operation has a full block data sent to the target with a probability equal to 1-R. If, at block 504, the block corresponds to the probability 1-R, at block 512, the full data for the block is sent from the source to the target. At block 514, if there are additional data blocks to replicated, process 312' repeats at block 504 until the data blocks have been replicated. If, at block 514, there are no remaining data blocks to be replicated, then process 312' completes at block 518.

Described embodiments may provide systems and methods for performing hash-based data replication in a storage system. Described embodiments may determine operating conditions of the storage system and may set, based upon the determined operating conditions, configuration settings of data replication operations to replicate selected data from a source device to a target device. The data replication operation may send, based upon the one or more configuration settings, at least one of (i) a hash value associated with the selected data to the one or more target devices, and (ii) the selected data to the one or more target devices.

In some embodiments, the operating conditions may include a processor usage value associated with a processor of the storage system, a link usage value associated with a communication link of the storage system, and/or an overhead value associated with performing the data replication operation. The overhead value may include an estimated hash overhead value associated with generating and sending the hash value and an estimated block overhead value associated with sending the selected data to the target. A hash hit value, which may include tracking a historic hash hit rate of the storage system may be determined. A hash-based replication threshold, P, is set based on the determined operating conditions, the overhead values, and the hash hit value.

In some embodiments, if the hash hit value has reached the hash-based replication threshold, then the hash value is generated and sent to the target device. If the generated hash value was not previously stored on the target device or if the hash hit value has not reached the hash-based replication threshold, then the full data is sent to the target device. In some embodiments, a replication parameter, R, corresponds to a percentage of the selected data for which a hash value should be generated. If the hash hit value has reached the hash-based replication threshold, the replication parameter may be increased, or if the hash hit value has not reached the hash-based replication threshold, the replication parameter may be decreased. In an illustrative embodiment, the replication parameter is either 0.1% and 100%, although other values may be employed.

Figure 6A:
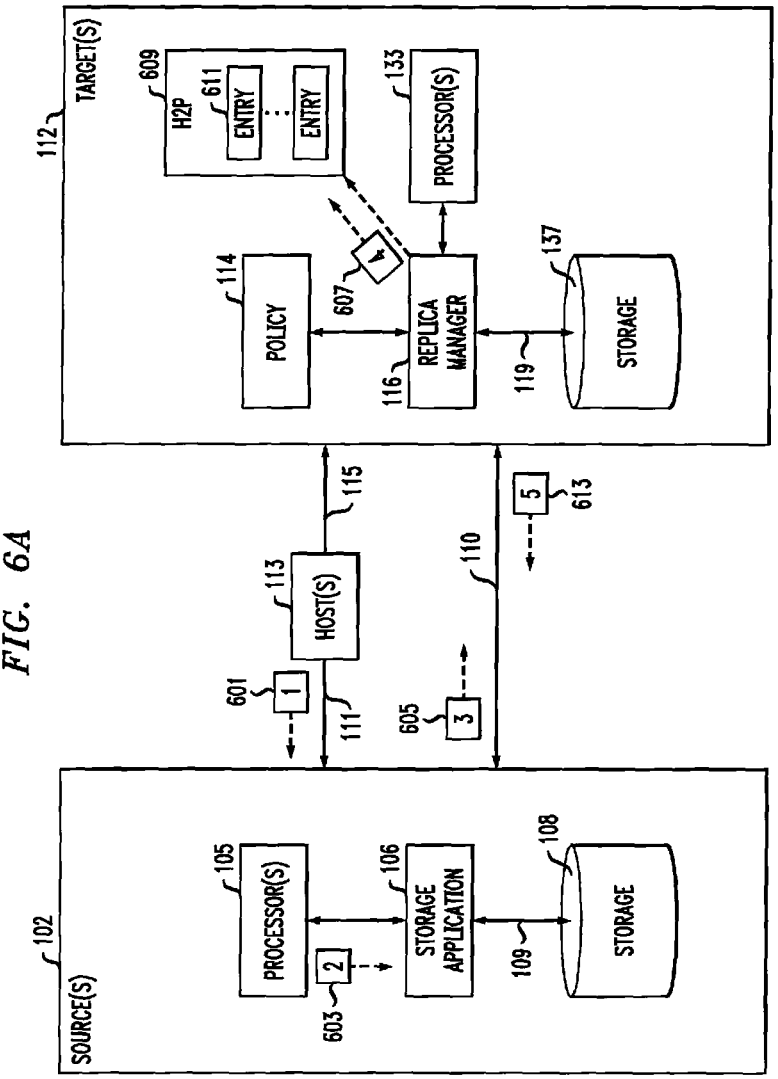
FIGS. 6A and 6B are diagrams showing an illustrative data flow of the processes shown in FIGS. 3, 4 and 5.
Figure 6B:
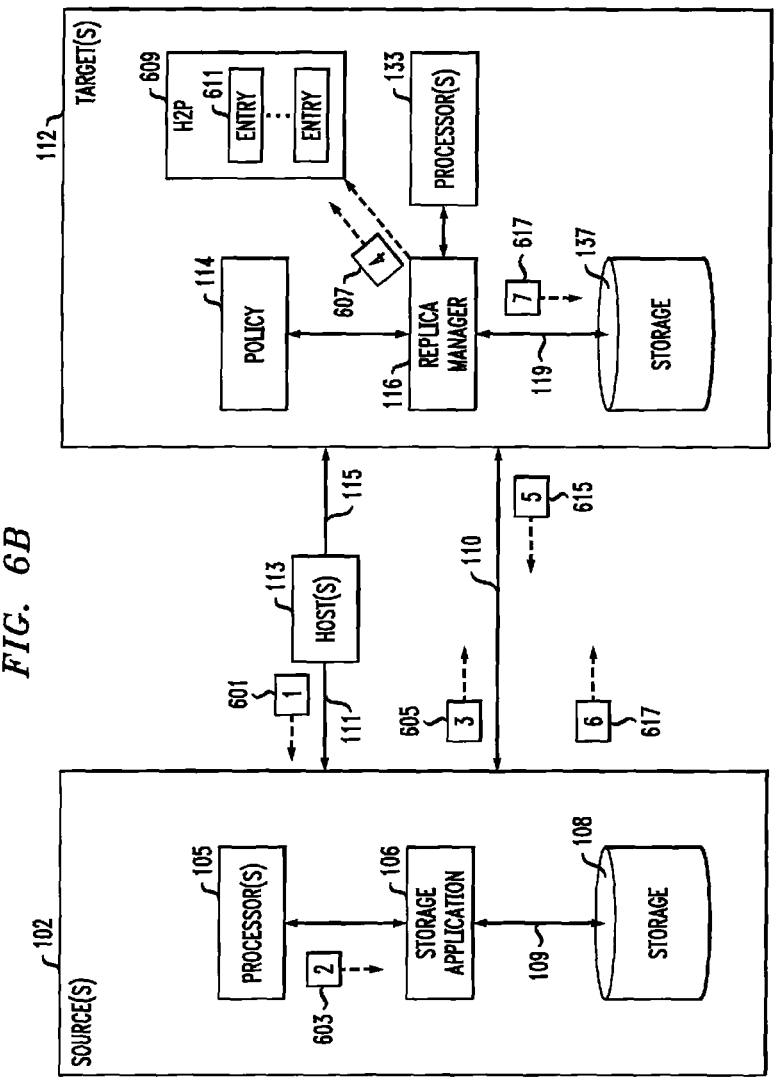

FIGS. 6A and 6B are diagrams of storage system 100 showing an illustrative data flow of processes 300, 306' and 312' shown in FIGS. 3, 4 and 5. As described herein, some embodiments of storage system 100 may employ one or more hash tables to maintain a mapping between I/O (or logical) addresses associated with data and hash values, and to maintain a mapping between hash values and physical storage addresses of the data. As shown in FIG. 6A, host 113 may first send data (e.g., data 601) to source site 102. Processor 105 of source site 102 may generate a hash value associated with data 601, shown as hash value 603. In some embodiments, storage application 106 may employ one or more A2H and/or H2P hash tables (not shown) to map hash value 603 to a storage location of data 601 in storage 108.

Referring to FIG. 6A, during a hash-based data replication operation 120 (e.g., 605), storage system 100 may send a hash value (e.g., 605) from source site 102 to target site 112 instead of sending the full data of the data replication operation. Target site 112 may receive hash value 605, for example, at replica manager 116. Replica manager 116 may provide the received hash value (e.g., as hash value 607) to one or more hash tables (e.g., H2P table 609). H2P table 609 includes one or more entries 611 that map between a given hash value and an associated physical address of storage 137. If hash value 607 is already stored in H2P table 609, then there is a hash hit, meaning that the full data associated with hash value 607 is already stored in storage 137. In instances where storage system 100 determines a hash hit, full block data associated with hash-based data replication operation 120 may not be sent from source site 102 to target site 112, since the data is already stored on target site 112. In some embodiments, target site 112 may optionally send a hash hit acknowledgment 613 to source site 102.

Referring to FIG. 6B, during a hash-based data replication operation 120 (e.g., 605), storage system 100 may send a hash value (e.g., 605) from source site 102 to target site 112 instead of sending the full data of the data replication operation. Target site 112 may receive hash value 605, for example, at replica manager 116. Replica manager 116 may provide the received hash value (e.g., as hash value 607) to one or more hash tables (e.g., H2P table 609). H2P table 609 includes one or more entries 611 that map between a given hash value and an associated physical address of storage 137. If hash value 607 is not already stored in H2P table 609, then there is a hash miss, meaning that the full data associated with hash value 607 is not yet stored in storage 137. In instances where storage system 100 determines a hash miss, a hash miss message 615 may be sent to source site 102. Source site 102 may then send the full block data (e.g., 617) to target site 112.

As described herein, some embodiments may attempt to send the hash value (e.g., 605) before sending the full block data (e.g., 617), for a determined percentage (e.g., percentage R) of pages for data replication operations (e.g., 120).

Figure 7:
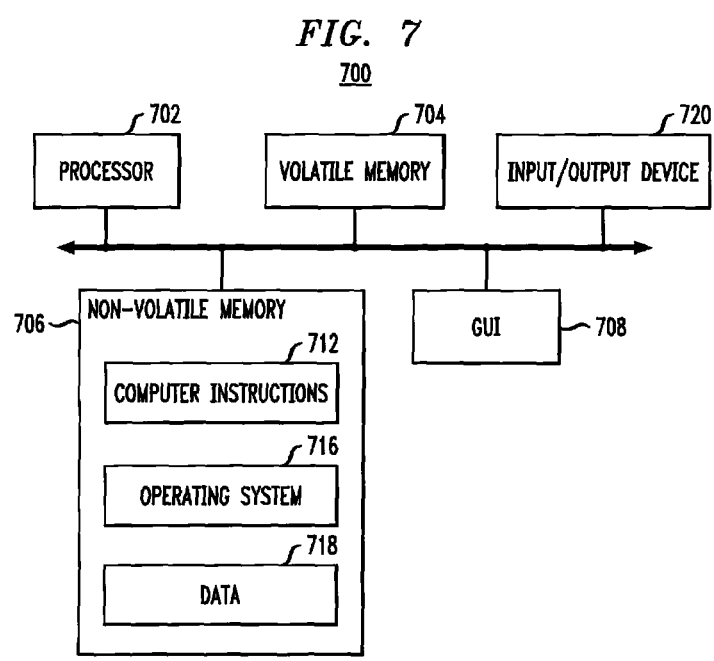
FIG. 7 is a block diagram of an example of a hardware device that may perform at least a portion of the processes shown in FIGS. 3, 4 and 5.

Referring to FIG. 7, in some embodiments, source site 102 and/or target site 112 may be implemented as one or more computers. Computer 700 may include processor 702, volatile memory 704 (e.g., RAM), non-volatile memory 706 (e.g., a hard disk drive, solid state drive such as a flash drive, a hybrid magnetic and solid state drive, etc.), graphical user interface (GUI) 708 (e.g., a mouse, a keyboard, a display, and so forth) and input/output (I/O) device 720. Non-volatile memory 706 stores computer instructions 712, an operating system 716 and data 718 such that, for example, the computer instructions 712 are executed by the processor 702 out of volatile memory 704 to perform at least a portion of processes 300, 306' and 312' (FIGS. 3, 4 and 5). Program code may be applied to data entered using an input device of GUI 708 or received from I/O device 720.

Processes 300, 306' and 312' (FIGS. 3, 4 and 5) are not limited to use with the hardware and software of FIG. 7 and may find applicability in any computing or processing environment and with any type of machine or set of machines that is capable of running a computer program. Processes 300, 306' and 312' may be implemented in hardware, software, or a combination of the two.

The processes described herein are not limited to the specific embodiments described. For example, processes 300, 306' and 312' are not limited to the specific processing order shown in FIGS. 3, 4 and 5. Rather, any of the blocks of processes 300, 306' and 312' may be re-ordered, combined or removed, performed in parallel or in serial, as necessary, to achieve the results set forth herein.

Processor 702 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method comprising:
   determining an overhead value associated with performing a data replication operation, the overhead value being determined based on one or more operating conditions of a storage system, the storage system having at least one source device and one or more target devices, and the overhead value identifying a load that would be placed on the storage system when the data replication operation is executed;
   setting, based upon the overhead value, one or more configuration settings of the data replication operation of the storage system, the data replication operation to replicate selected data from the at least one source device to the one or more target devices; and
   initiating the data replication operation for the selected data and sending, based upon the one or more configuration settings, at least one of (i) a hash value associated with the selected data to the one or more target devices, and (ii) the selected data to the one or more target devices.

2. The method of claim 1, wherein determining the overhead value comprises at least one of:
   determining an estimated hash overhead value associated with sending the hash value associated with the selected data to the one or more target devices;
   determining an estimated block overhead value associated with sending the selected data to the one or more target devices; and
   determining an estimated hash hit value, the estimated hash hit value being associated with an estimated likelihood that the hash value associated with the selected data is stored on the one or more target devices.

3. The method of claim 2, further comprising tracking an actual hash hit value, the actual hash hit value being associated with a historic hash hit rate of one or more previous data replication operations of the storage system.

4. The method of claim 3, further comprising determining a hash-based replication threshold, wherein the hash-based replication threshold is based on the determined one or more operating conditions, the estimated hash overhead value, the estimated block overhead value, and at least one of the estimated hash hit value and the actual hash hit value.

5. The method of claim 4, Wherein determining to send (i) the hash value associated with the selected data to the one or more target devices, or (ii) the selected data to the one or more target devices further comprises:
   generating the hash value associated with the selected data if at least one of the estimated hash hit value and the actual hash hit value has reached the hash-based replication threshold;
   sending the hash value to the one or more target devices;
   determining a hash hit if the hash value was previously stored on the one or more target devices; and
   completing the data replication operation for the selected data based upon the hash hit.

6. The method of claim 5, further comprising sending the selected data to the one or more target devices if the hash value was not previously stored on the one or more target devices or if at least one of the estimated hash hit value and the actual hash hit value has not reached the hash-based replication threshold.

7. The method of claim 6, wherein the one or more configuration settings comprise a replication parameter, the replication parameter corresponding to a percentage of the selected data for which a hash value should be generated, the method further comprising:
   generating the hash value for an amount of the selected data corresponding to the replication parameter if at least one of the estimated hash hit value and the actual hash hit value has reached the hash-based replication threshold.

8. The method of claim 7, further comprising increasing the replication parameter if at least one of the estimated hash hit value and the actual hash hit value has reached the hash-based replication threshold.

9. The method of claim 8, further comprising decreasing the replication parameter if at least one of the estimated hash hit value and the actual hash hit value has not reached the hash-based replication threshold.

10. The method of claim 9, wherein the replication parameter is between 0.1% and 100%.

11. The method of claim 1, further comprising weighting each of the one or more operating conditions by corresponding priority coefficients, the corresponding priority coefficients being based on settings received by the storage system.

12. The method of claim 1, further comprising at least one of:
   performing the data replication operation as a synchronous replication operation when the selected data stored on the at least one source device is changed; and
   performing the data replication operation as an asynchronous replication operation periodically during operation of the storage system, a frequency of the asynchronous replication operation based on a replication policy of the storage system.

13. A system comprising:
   a processor; and
   memory storing computer program code that when executed on the processor causes the processor to execute a data replication process between at least one source device and at least one target device in a storage system operable to perform the operations of:
      determining an overhead value associated with performing a data replication operation, the overhead value being determined based on one or more operating conditions of a storage system, the storage system having at least one source device and one or more target devices, and the overhead value identifying a load that would be placed on the storage system when the data replication operation is executed;

setting, based upon the overhead value, one or more configuration settings of the data replication operation of the storage system, the data replication operation to replicate selected data from the at least one source device to the one or more target devices; and initiating the data replication operation for the selected data and sending, based upon the one or more configuration settings, at least one of (i) a hash value associated with the selected data to the one or more target devices, and (ii) the selected data to the one or more target devices.

14. The system of claim 13, wherein determining the overhead value comprises at least one of:

determining an estimated hash overhead value associated with sending the hash value associated with the selected data to the one or more target devices;

determining an estimated block overhead value associated with sending the selected data to the one or more target devices;

determining an estimated hash hit value, the estimated hash hit value being associated with an estimated likelihood that the hash value associated with the selected data is stored on the one or more target devices; and tracking an actual hash hit value, the actual hash hit value being associated with a historic hash hit rate of one or more previous data replication operations of the storage system.

15. The system of claim 14, wherein the computer program code is further operable to perform the operation of determining a hash-based replication threshold, wherein the hash-based replication threshold is based on the one or more operating conditions, the estimated hash overhead value, the estimated block overhead value, and at least one of the estimated hash hit value and the actual hash hit value.

16. The system of claim 15, wherein sending (i) the hash value associated with the selected data to the one or more target devices, or (ii) the selected data to the one or more target devices comprises the operations of:

generating the hash value associated with the selected data if at least one of the estimated hash hit value and the actual hash hit value has reached the hash-based replication threshold;

sending the hash value to the one or more target devices;

determining a hash hit if the hash value was previously stored on the one or more target devices; and completing the data replication operation for the selected data based upon the hash hit.

17. The system of claim 16, wherein the computer program code is further operable to perform the operation of sending the selected data to the one or more target devices if the hash value was not previously stored on the one or more target devices or if at least one of the estimated hash hit value and the actual hash hit value has not reached the hash-based replication threshold.

18. The system of claim 17, wherein the one or more configuration settings comprise a replication parameter, the replication parameter corresponding to a percentage of the selected data for Which a hash value should be generated, and wherein the computer program code is further operable to perform the operations of:

generating the hash value for an amount of the selected data corresponding to the replication parameter if at least one of the estimated hash hit value and the actual hash hit value has reached the hash-based replication threshold;

increasing the replication parameter if at least one of the estimated hash hit value and the actual hash hit value has reached the hash-based replication threshold; and decreasing the replication parameter if at least one of the estimated hash hit value and the actual hash hit value has not reached the hash-based replication threshold.

19. A computer program product including a non-transitory computer readable storage medium having computer program code encoded thereon that when executed on a processor of a computer causes the computer to execute a data replication process between at least one source device and at least one target device in a storage system, the computer program product comprising:

computer program code for determining an overhead value associated with performing a data replication operation, the overhead value being determined based on one or more operating conditions of a storage system, the storage system having at least one source device and one or more target devices, and the overhead value identifying a load that would be placed on the storage system when the data replication operation is executed;

computer program code for setting, based upon the overhead value, one or more configuration settings of the data replication operation of the storage system, the data replication operation to replicate selected data from the at least one source device to the one or more target devices; and computer program code for initiating the data replication operation for the selected data and sending, based upon the one or more configuration settings, at least one of (i) a hash value associated with the selected data to the one or more target devices, and (ii) the selected data to the one or more target devices.

20. The computer program product of claim 19, wherein determining the overhead value comprises at least one of:

computer program code for determining an estimated hash overhead value associated with sending the hash value associated with the selected data to the one or more target devices;

computer program code for determining an estimated block overhead value associated with, sending the selected data to the one or more target devices;

computer program code for determining an estimated hash hit value, the estimated hash hit value being associated with an estimated likelihood that the hash value associated with the selected data is stored on the one or more target devices;

computer program code for tracking an actual hash hit value, the actual hash hit value being associated with a historic hash hit rate of one or more previous data replication operations of the storage system;

computer program code for determining a hash-based replication threshold, wherein the hash-based replication threshold is based on the one or more operating conditions, the estimated hash overhead value, the estimated block overhead value, and at least one of the estimated hash hit value and the actual hash hit value;

computer program code for generating the hash value associated with the selected data if at least one of the estimated hash hit value and the actual hash hit value has reached the hash-based replication threshold;

computer program code for sending the hash value to the one or more target devices;

computer program code for determining a hash hit if the hash value was previously stored on the one or more target devices; and computer program code for completing the data replication operation for the selected data based upon the hash hit.

\* \* \* \* \*